United States Patent
Gustafson

(10) Patent No.: US 11,331,984 B2
(45) Date of Patent: May 17, 2022

(54) DUAL SLIDER WINDOW ASSEMBLY

(71) Applicant: Magna Mirrors of America, Inc., Holland, MI (US)

(72) Inventor: Peggy L. Gustafson, Holland, MI (US)

(73) Assignee: MAGNA MIRRORS OF AMERICA, INC., Holland, MI (US)

(*) Notice: Subject to any disclaimer, the term of this patent is extended or adjusted under 35 U.S.C. 154(b) by 177 days.

(21) Appl. No.: 16/748,009

(22) Filed: Jan. 21, 2020

(65) Prior Publication Data

US 2020/0240191 A1 Jul. 30, 2020

Related U.S. Application Data

(60) Provisional application No. 62/797,533, filed on Jan. 28, 2019.

(51) Int. Cl.
| | |
|---|---|
| *B60J 1/18* | (2006.01) |
| *E05F 11/53* | (2006.01) |
| *F16H 19/04* | (2006.01) |
| *E05F 15/635* | (2015.01) |
| *E05F 15/689* | (2015.01) |

(52) U.S. Cl.
CPC .......... *B60J 1/1853* (2013.01); *E05F 11/535* (2013.01); *E05F 15/635* (2015.01); *E05F 15/689* (2015.01); *F16H 19/04* (2013.01); *E05Y 2201/716* (2013.01); *E05Y 2201/722* (2013.01); *E05Y 2900/55* (2013.01)

(58) Field of Classification Search
CPC ..... E05F 11/535; E05F 11/423; E05F 15/635; E05F 15/655; E05F 15/657; E05F 17/004; B60J 1/1853
See application file for complete search history.

(56) References Cited

U.S. PATENT DOCUMENTS

| | | | |
|---|---|---|---|
| 2,791,420 A * | 5/1957 | Provost ..................... | E06B 3/44 49/118 |
| 4,635,398 A | 1/1987 | Nakamura | |
| | (Continued) | | |

FOREIGN PATENT DOCUMENTS

| | | | | |
|---|---|---|---|---|
| AT | 101077 B * | 9/1925 | ............ | E05F 17/004 |
| DE | 19527746 C1 | 6/1996 | | |
| | (Continued) | | | |

*Primary Examiner* — Marcus Menezes
(74) *Attorney, Agent, or Firm* — Honigman LLP

(57) ABSTRACT

A vehicular rear slider window assembly includes an upper rail and a lower rail and a fixed window panel. The rails are attached at an inner surface of the fixed window panel above and below an opening. First and second movable window panels are movable along the rails. The drive system includes a drive element at the first movable window panel, a gear element rotatably mounted at a rail of the window assembly, and first and second toothed tracks attached at the respective movable window panel and extending toward and overlapping the other movable window panel. When the drive system is operated, the drive element imparts movement of the first movable window panel along the rails. Movement of the first movable window panel causes a corresponding movement of the second movable window panel in an opposite direction along the rails via engagement of the gear element with the toothed tracks.

21 Claims, 6 Drawing Sheets

(56) References Cited

U.S. PATENT DOCUMENTS

| | | | |
|---|---|---|---|
| 4,920,698 A * | 5/1990 | Friese | E05F 11/535 |
| | | | 49/380 |
| 4,995,195 A * | 2/1991 | Olberding | E05F 15/652 |
| | | | 49/118 |
| 5,146,712 A | 9/1992 | Hlavaty | |
| 5,531,046 A | 7/1996 | Kollar et al. | |
| 5,572,376 A | 11/1996 | Pace | |
| 5,644,869 A | 7/1997 | Buchanan, Jr. | |
| 5,669,181 A | 9/1997 | Kollar et al. | |
| 5,799,444 A * | 9/1998 | Freimark | B60J 1/1853 |
| | | | 49/209 |
| 5,799,449 A * | 9/1998 | Lyons | B60J 1/1853 |
| | | | 296/146.1 |
| 5,853,895 A | 12/1998 | Lewno | |
| 6,038,819 A | 3/2000 | Klein | |
| 6,068,719 A | 5/2000 | Lewno | |
| 6,119,401 A | 9/2000 | Lin et al. | |
| 6,119,402 A * | 9/2000 | Wisner | E05F 11/535 |
| | | | 49/362 |
| 6,591,552 B1 * | 7/2003 | Rasmussen | B60J 1/1853 |
| | | | 49/121 |
| 6,691,464 B2 | 2/2004 | Nestell et al. | |
| 6,748,700 B1 * | 6/2004 | McAllister | E05D 15/16 |
| | | | 49/119 |
| 6,846,039 B2 | 1/2005 | Lewno | |
| 6,955,009 B2 | 10/2005 | Rasmussen | |
| 7,003,916 B2 | 2/2006 | Nestell et al. | |
| 7,014,251 B1 * | 3/2006 | Husk | B60J 1/1853 |
| | | | 277/630 |
| 7,073,293 B2 | 7/2006 | Galer | |
| 7,185,943 B2 | 3/2007 | Lesle et al. | |
| 7,838,115 B2 | 11/2010 | Lewno | |
| 7,937,893 B2 * | 5/2011 | Pribisic | E05F 15/70 |
| | | | 49/139 |
| 8,151,519 B2 * | 4/2012 | Bello | E05F 15/643 |
| | | | 49/380 |
| 8,322,073 B2 | 12/2012 | Lewno | |
| 8,402,695 B2 | 3/2013 | Smith et al. | |
| 8,881,458 B2 | 11/2014 | Snider et al. | |
| 8,915,018 B2 | 12/2014 | Snider | |
| 8,938,914 B2 | 1/2015 | Hulst et al. | |
| 9,475,364 B2 | 10/2016 | Tooker et al. | |
| 9,475,370 B2 | 10/2016 | Snider et al. | |
| 9,579,955 B2 | 2/2017 | Snider | |
| 9,874,050 B2 * | 1/2018 | Mair | E06B 3/50 |
| 10,501,977 B2 * | 12/2019 | Snider | B60J 1/1853 |
| 2003/0213179 A1 * | 11/2003 | Galer | B60J 1/1853 |
| | | | 49/413 |
| 2004/0020131 A1 | 2/2004 | Galer et al. | |
| 2004/0111970 A1 * | 6/2004 | Fenelon | E05F 11/525 |
| | | | 49/349 |
| 2006/0011311 A1 * | 1/2006 | Petridis | E05F 17/004 |
| | | | 160/196.1 |
| 2006/0107600 A1 | 5/2006 | Nestell et al. | |
| 2008/0127563 A1 | 6/2008 | Tooker | |
| 2008/0229667 A1 | 9/2008 | Dufour et al. | |
| 2009/0266185 A1 | 10/2009 | Harie | |
| 2010/0263290 A1 | 10/2010 | Pawloski et al. | |
| 2011/0056140 A1 | 3/2011 | Lewno | |
| 2013/0174488 A1 | 7/2013 | Snider et al. | |
| 2015/0101254 A1 | 4/2015 | Tooker et al. | |
| 2017/0356231 A1 | 12/2017 | Snider et al. | |
| 2019/0218848 A1 * | 7/2019 | Fujita | E05F 15/79 |
| 2019/0299762 A1 | 10/2019 | Hiramatsu | |
| 2019/0383084 A1 | 12/2019 | Snider et al. | |

FOREIGN PATENT DOCUMENTS

| | | | |
|---|---|---|---|
| DE | 102010000029 A1 * | 7/2011 | E06B 3/4609 |
| EP | 1932993 A1 | 6/2008 | |

* cited by examiner dow assemblies described in U.S. Publication No. US-2017-0356231, which is hereby incorporated herein by reference in its entirety.

DUAL SLIDER WINDOW ASSEMBLY

CROSS REFERENCE TO RELATED APPLICATION

The present application claims the filing benefits of U.S. provisional application Ser. No. 62/797,533, filed Jan. 28, 2019, which is hereby incorporated herein by reference in its entirety.

FIELD OF THE INVENTION

The present invention relates to movable or slider window assemblies for vehicles and, more particularly to a side or rear slider window assembly for a vehicle.

BACKGROUND OF THE INVENTION

It is known to provide a slider window assembly for an opening of a vehicle, such as a rear slider window assembly for a rear opening of a pickup truck. Conventional slider window assemblies for rear openings of trucks or the like typically include three panels, such as two fixed window panels and a slidable window panel. The slidable window panel is supported by rails and may be moved along the rails to open and close the window.

SUMMARY OF THE INVENTION

The present invention provides a rear slider window assembly that has two movable window panels movable relative to one or more fixed window panels, with the movable panels moving along upper and lower rails or channels attached at the fixed window panel or panels. The movable panels are movably driven by a drive system that moves the panels in tandem, such that the movable panels open and close together. The rear slider window assembly thus provides for a larger central opening than may be achieved with a single movable window panel.

These and other objects, advantages, purposes and features of the present invention will become apparent upon review of the following specification in conjunction with the drawings.

DESCRIPTION OF THE PREFERRED EMBODIMENTS

Figure 1:
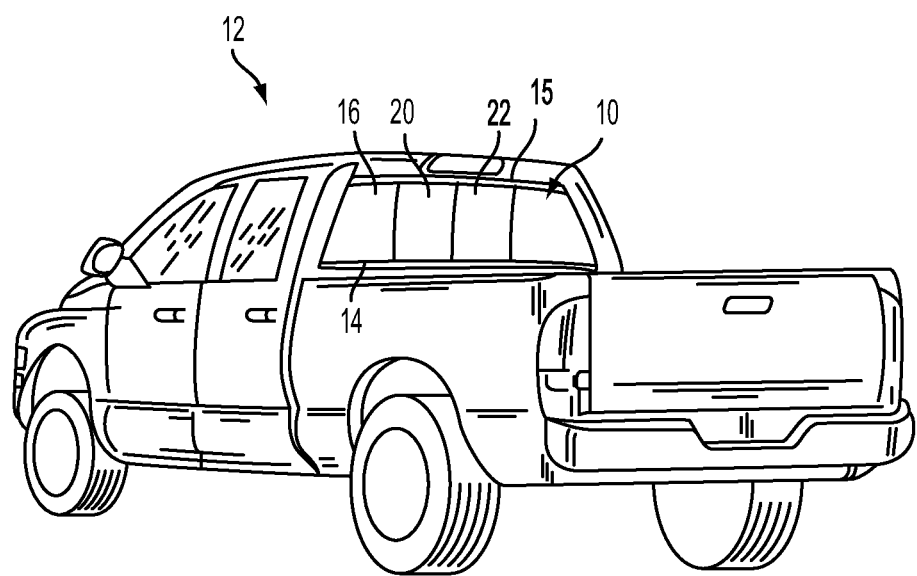
FIG. 1 is a rear perspective view of a pickup truck having a rear slider window assembly in accordance with the present invention.
Figure 2:
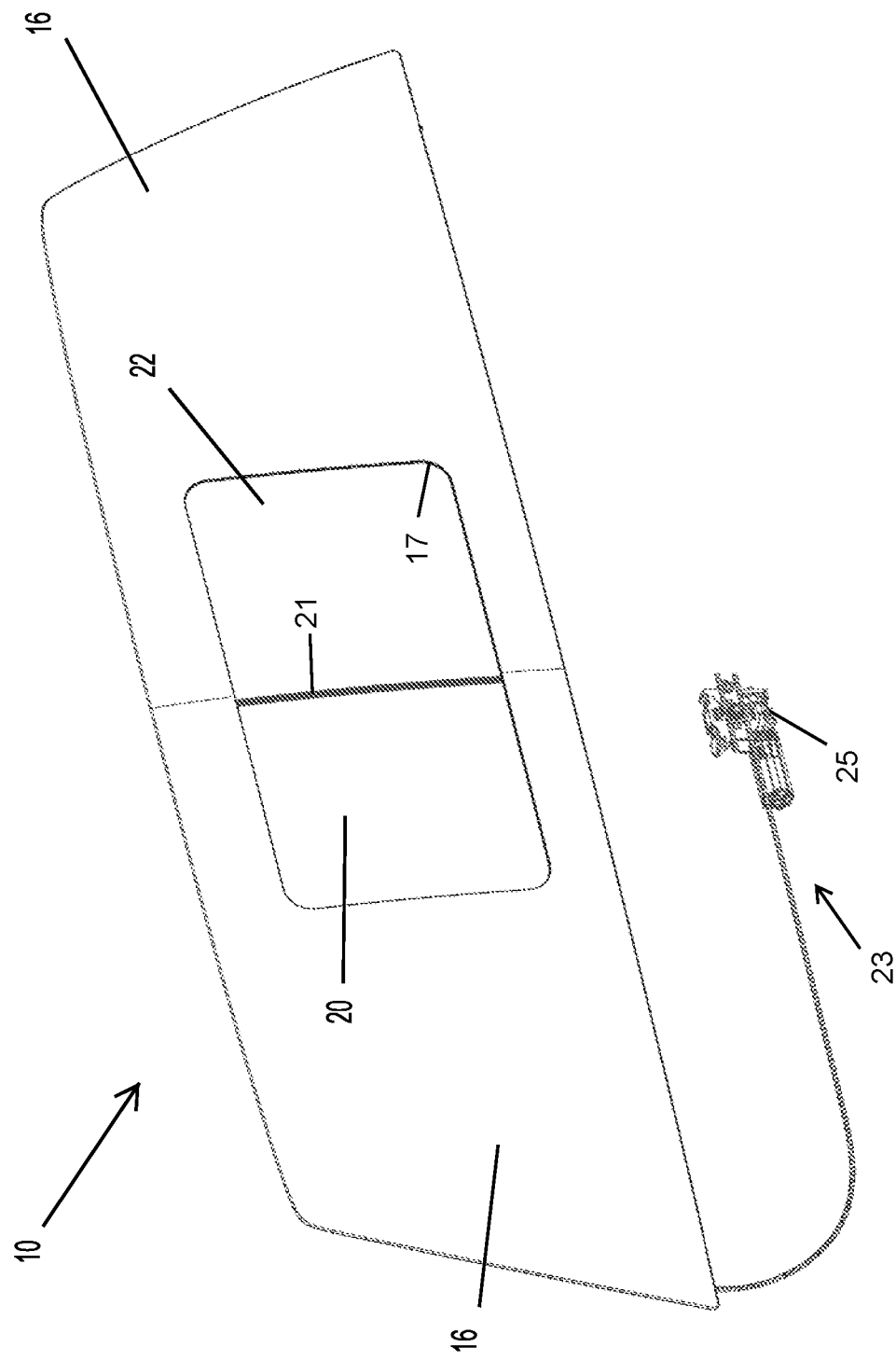
FIG. 2 is a rear perspective view of the rear slider window assembly of the present invention, shown in a closed state.
Figure 3:
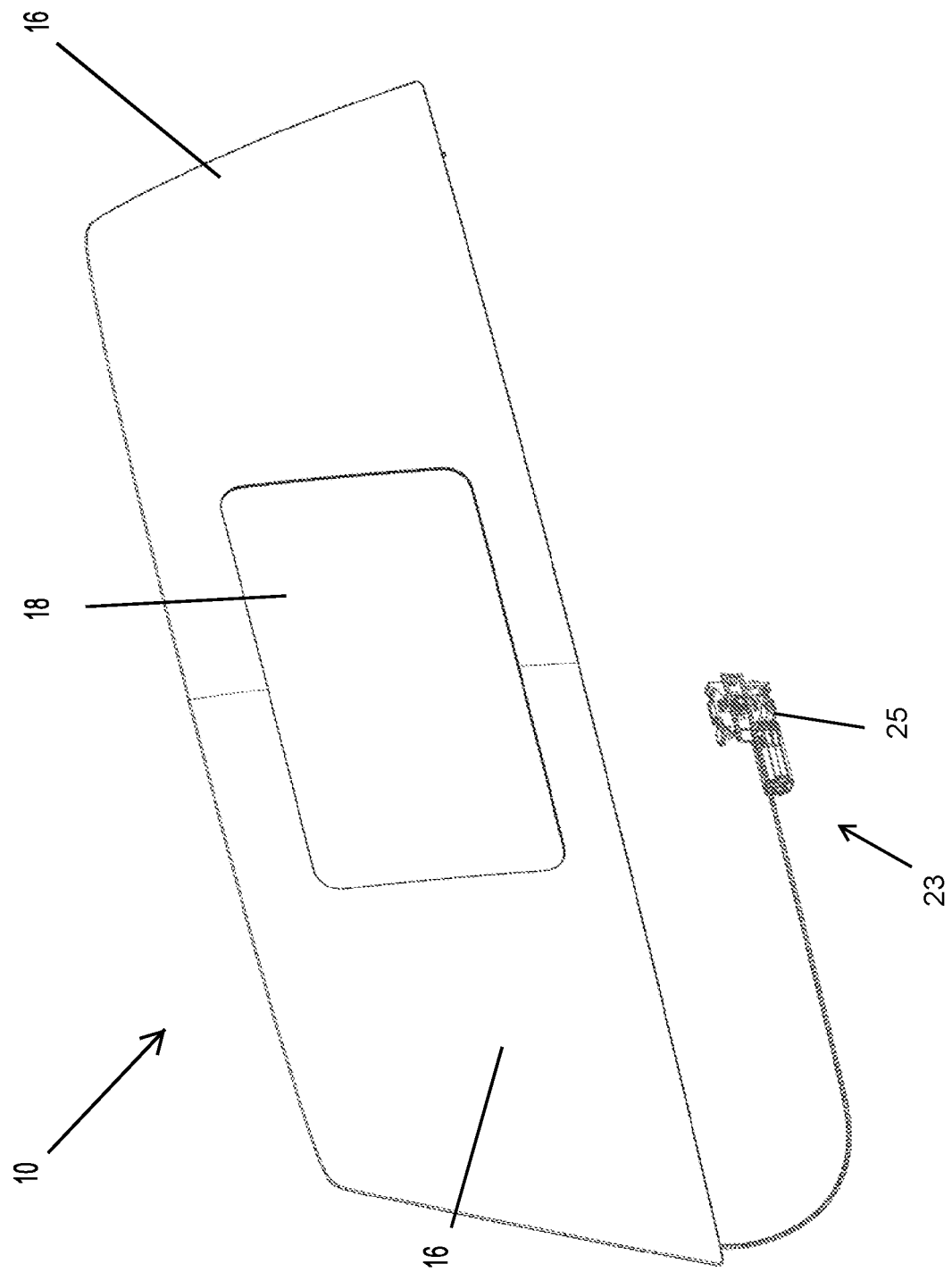
FIG. 3 is a rear perspective view of the rear slider window assembly of FIG. 2, shown in an opened state.

Referring now to the drawings and the illustrative embodiments depicted therein, a rear slider window assembly 10 of a vehicle 12 (such as a pickup truck or the like) includes a window frame having a lower channel portion or rail 14 and an upper channel portion or rail 15, a fixed window panel 16 (having an aperture 18 formed therethrough) and a pair of movable window panels 20, 22 that are movable relative to the window frame and fixed window panel 16 between an opened position and a closed position (FIGS. 1-3). The lower channel portion or rail and upper channel portion or rail are disposed at and along an inner surface of the fixed window panel 16 to facilitate sliding of movable window panels 20, 22 horizontally across window assembly 10 between the opened and closed positions.

The fixed window panel may comprise a single fixed window panel with the aperture or opening 18 (FIG. 3) formed between opposite side panels or portions. Optionally, the side window panels may be two separate side window panels that are spaced apart so as to define an opening therebetween (such as shown in FIG. 1). The slider or movable window panels 20, 22 (FIG. 2) are movable along the lower rail 14 and the upper rail 15 to open and close the opening, as discussed below. The window panels are moved in tandem via a single drive cable or element attached to only one of the window panels, as also discussed below. The slider window assembly may comprise aspects of the window assemblies described in U.S. Publication No. US-2017-0356231, which is hereby incorporated herein by reference in its entirety.

The upper and lower rails or channel portions comprise generally U-shaped channels in and along which the respective upper and lower regions of the movable panels are received. One of the walls of the channel portion is at and along the inner surface of the fixed window panel and an opposite side wall of the channel portion is spaced from the other wall via the bottom wall (for the lower rail) or the top wall (for the upper rail) of the channel portion.

The movable panels thus move along the rails or channels and may engage respective seals or seal portions 17 at the periphery of the aperture of the fixed window panel 16. One or both of the movable panels 20, 22 may have a sealing element 21 at its inboard perimeter edge region so that the two movable panels seal together when closed. The movable panels may include a blackout or frit layer about their peripheries to conceal any sealing elements and/or electrical connections at the movable panels. Similarly, the fixed panel or panels may include a blackout or frit layer about the periphery or peripheries and about the aperture to conceal sealing elements and/or electrical connections and/or the rails or channels and/or the like.

Optionally, each of the slider window panels 20, 22 may be disposed at or be attached to or may include a lower carrier at the lower perimeter edge region of the slider window panel and that is slidably or movably received in the lower rail 14 of the frame portion. The movable or slider window panels 20, 22 may be movable, such as via manual pushing or pulling at the window panel or in response to actuation of a drive motor 25 of a drive motor assembly or system 23 that is operable to impart horizontal movement of one of the slider window panels 20 along the rails 14, 15, whereby a gear disposed at the upper or lower rail imparts a corresponding movement of the other slider window panel 22 along the rails 14, 15 in the opposite direction, as discussed below.

The drive system comprises a drive motor, which is operable to push or pull a cable or helical element or the like to move the slider window panel 20, such as by utilizing aspects of the window assemblies described in U.S. Publication No. US-2017-0356231, which is hereby incorporated herein by reference in its entirety. The drive cable or helical drive element or elongated helical cable or element is disposed at least partially along a side or end region of the lower rail 14 and routed to the motor-gear assembly, and the movable panel 20 is attached at the end of the cable or element. One or more connectors guide the cable or element, which is attached at an end of the movable window panel 20 so that the movable window panel moves with the cable or element as the cable or element is driven or moved via rotational driving of the motor and is moved in one direction or the other depending on the rotational drive direction of the motor.

Figure 4:
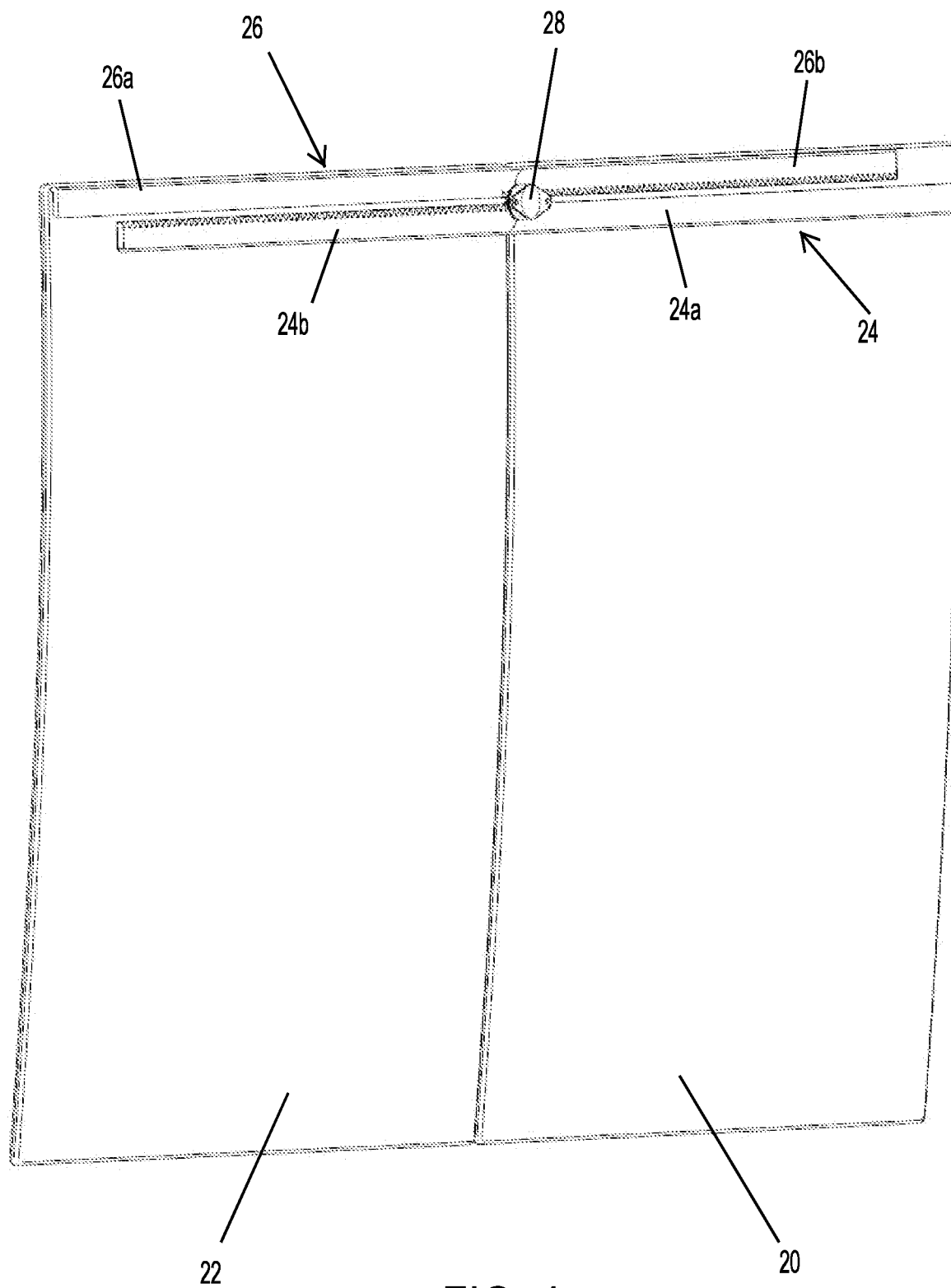
FIG. 4 is a front perspective view of the movable window panels and gear and track assembly of the drive system.
Figure 5:
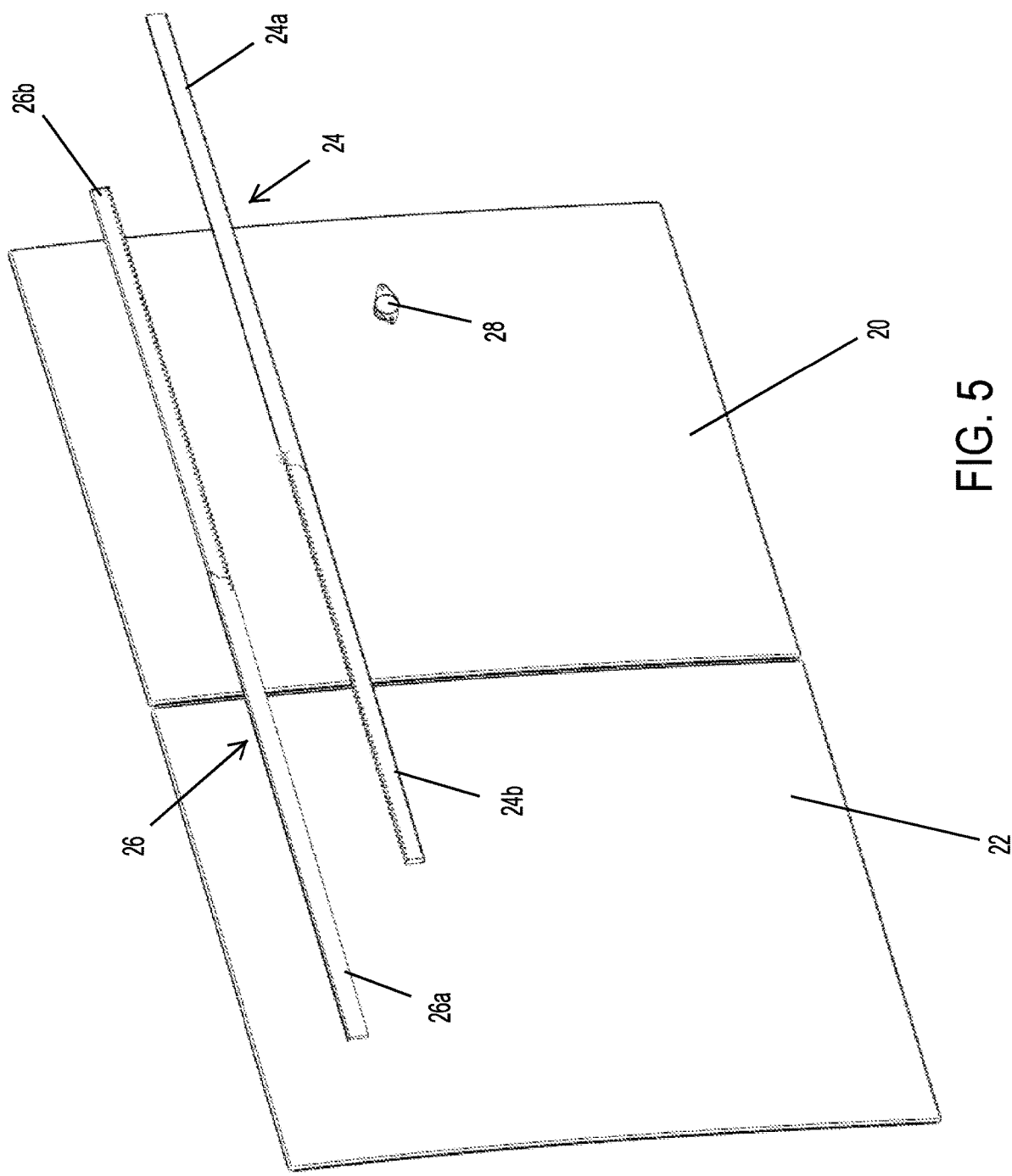
FIG. 5 is an exploded front perspective view of the movable window panels and gear and track assembly of the drive system.
Figure 6A:
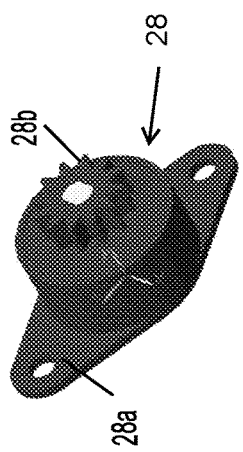
FIG. 6A is an enlarged perspective view of the gear element.
Figure 6:
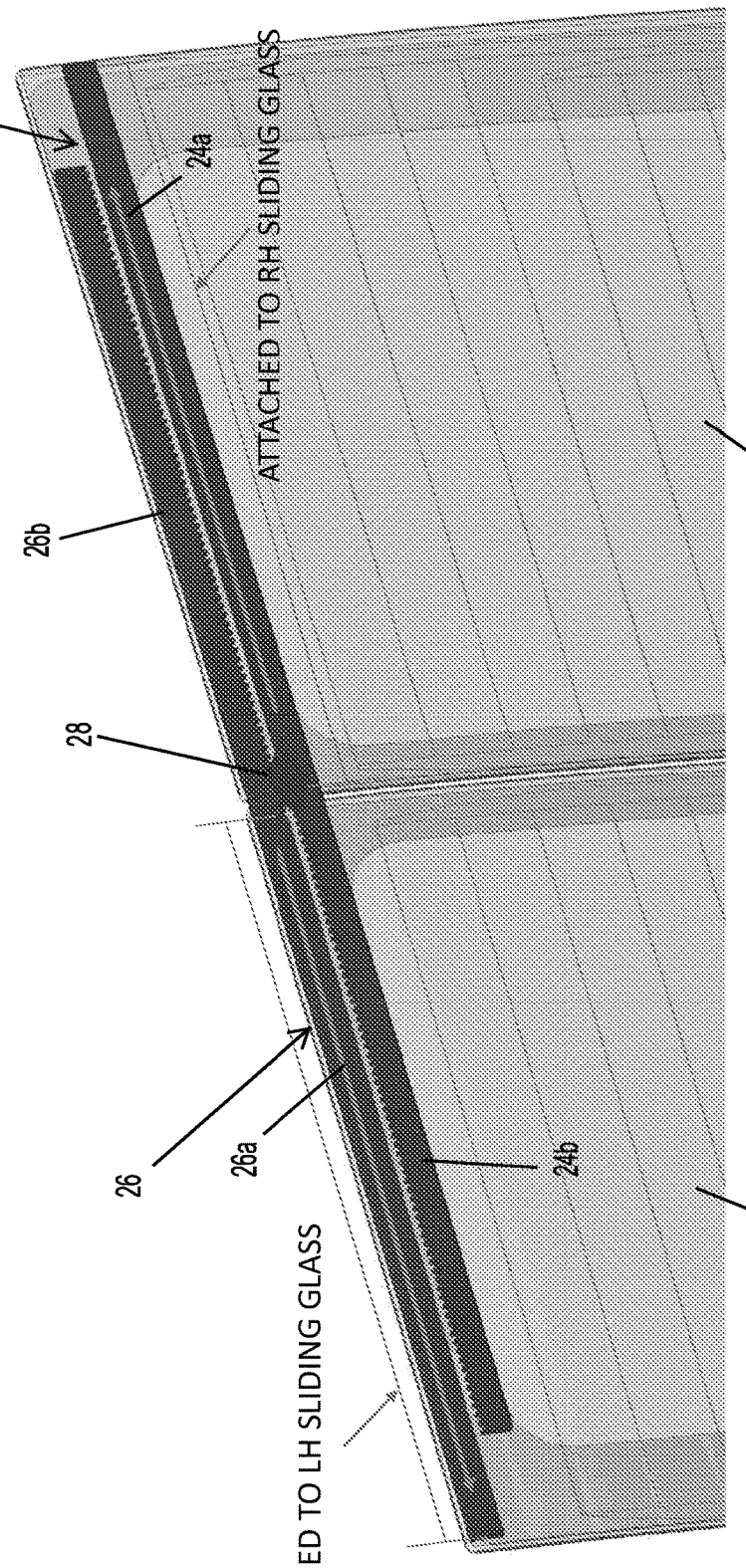
FIG. 6 is another front perspective view of the movable window panels and gear and track assembly of the drive system.

In the illustrated embodiment, and such as can be seen with reference to FIGS. 4-6, the movable panels 20, 22 have a respective toothed track 24, 26 attached along an upper region of the respective panel and extending across the upper region of the other panel. In other words, a toothed track 24 is attached (such as via adhesive bonding or the like) at the upper region of the movable panel 20 and extends across (but is not attached to) the upper region of the other movable panel 22, and a toothed track 26 is attached (such as via adhesive bonding or the like) at the upper region of the movable panel 22 and extends across (but is not attached to) the upper region of the other movable panel 20. Optionally, the toothed tracks 24, 26 may be attached along a lower region of the respective movable panels 20, 22. Each toothed track 24, 26 includes an attaching portion 24a, 26a that is adhered or bonded to the respective window panel 20, 22, and further includes a toothed portion 24b, 26b that extends from the attaching portion and that has a plurality of teeth arranged therealong.

The toothed portions 24b, 26b are arranged so as to engage a toothed gear 28b of a gear element 28. The gear element 28 comprises a base portion 28a that is attached at the upper rail 15 (such as via a bracket extending from the base portion over the toothed portions 24b, 26b or the like) and a toothed gear 28b that protrudes from the base portion 28a and is rotatably mounted at the base portion (and may be freely or substantially freely rotatable about an axis of rotation that is generally normal or perpendicular to the base portion). Optionally, for example, the base portion may be mounted at one of the walls of the U-shaped channel of the upper rail (such as the wall that is spaced from the fixed window panel), with the gear portion protruding through a hole or slot in the wall and into the channel where the gear portion engages the toothed portions of the tracks at the upper region of the window panels, which are received in the channel of the upper rail. Optionally, the base portion 28a may be mounted at the lower rail 14 or other fixed location of the rear slider window assembly. The toothed portions 24b, 26b are configured so that the teeth of one toothed portion 24b face upward and the teeth of the other toothed portion 26b face downward, whereby both toothed portions engage the gear element.

Thus, when panel 20 is moved via the drive mechanism, the corresponding movement of toothed portion 24b causes the toothed gear 28b to rotate, which in turn causes a corresponding movement (but in the opposite direction) of toothed portion 26b and panel 22. For example, and with reference to FIGS. 4 and 6, if the panel 20 is moved to the right to open the window, the upward directed toothed portion 24b moves to the right, which (due to the toothed engagement of the toothed portion 24b with the gear 28b) causes the gear 28b to rotate in a counter-clockwise direction, which (due to the toothed engagement of the gear 28b with the lower toothed portion 26b) in turn causes the lower directed toothed portion 26b and the panel 22 to move to the left.

Optionally, the movable or slider window panels 20, 22 may be opened or closed by manually pushing or pulling one or the other of the movable window panels 20, 22. As described above, moving one of the movable window panels 20, 22 imparts movement of the other panel 22, 20, but in the opposite direction, via rotation of the toothed gear 28b. The toothed gear is freely rotatable and may have a clutch mechanism, freewheel mechanism, or other means that allows for manual rotation of the toothed gear in either direction responsive to movement of one of the movable window panels, such that the movable window panels are moved in tandem (and in corresponding amounts in opposite directions) when the rotatable gear is rotated such as via powered movement or manual movement of one of the windows. Likewise, the drive motor and cable mechanism may have a clutch mechanism or may otherwise allow for manual movement of the movable window panel along the rails when the drive motor is not operated. The window assembly thus provides a simplified means for opening and closing the dual panel slider, and may utilize a single sided drive system (or may work with a manual system that opens and closes both panels in tandem via a user manually moving one of the panels) and thus avoids the cost of two cables or helical elements extending from the drive motor to both of the movable panels.

Optionally, it is envisioned that the rotatable gear may be rotatably driven via a rotational driving motor to impart movement of both movable window panels in the desired direction. The toothed gear thus may be rotatably driven via an electrically powered motor (such as responsive to actuation of a user input or human machine interface (HMI) in the cabin of the vehicle) and may have a clutch mechanism or other means that allows for manual rotation of the toothed gear responsive to manual movement of one of the movable window panels, such that the movable window panels are moved in tandem when the rotatable gear is electrically driven or rotated and when the rotatable gear is manually rotated such as via manual movement of one of the window panels.

Optionally, the fixed window panels and movable window panels may include one or more electrically conductive elements, such as heater grids or the like, which may be powered utilizing aspects of the window assemblies described in U.S. Pat. Nos. 8,881,458, 8,402,695, which are hereby incorporated herein by reference in their entireties. For example, a flexible electrical connector may electrically connect between a heater grid at a respective fixed panel and a heater grid of the respective movable window panel. The electrical connectors may power the heater grids of the movable window panels irrespective of whether the window panels are opened or closed.

Thus, the present invention provides a rear slider window assembly with a pair of movable window panels that are moved along rails between opened and closed positions relative to a fixed window panel and aperture or opening formed through the fixed window panel. The rails may guide the movable panels along the rear of the fixed window panel so that the movable window panels are behind the fixed panel when in the closed position (and engaging a sealing element that circumscribes the opening of the fixed window panel, such as a sealing element of the type described in U.S. Pat. No. 9,475,364, incorporated above), or optionally the rails may guide pins of a carrier or frame along the fixed panel and towards the fixed panel such that the movable window panels are moved into the opening when closed so as to provide a generally flush window surface when closed (such as by utilizing aspects of the window assemblies described in U.S. Pat. No. 8,881,458, which is hereby incorporated herein by reference in its entirety).

Optionally, the window assembly or assemblies of the present invention may utilize aspects of the window assemblies described in U.S. Pat. Nos. 8,915,018; 8,402,695; 8,322,073; 7,838,115; 7,073,293; 7,003,916; 6,846,039; 6,691,464; 6,068,719 and/or 5,853,895, and/or U.S. Publication Nos. US-2011-0056140; US-2006-0107600; US-2008-0127563; US-2004-0020131; US-2003-0213179, which are hereby incorporated herein by reference in their entireties. Optionally, the drive motor assembly may utilize aspects of the drive assemblies of the types described in U.S. Pat. Nos. 4,920,698; 4,995,195; 5,146,712; 5,531,046; 5,572,376; 6,119,401; 6,955,009; 7,073,293 and/or 9,475,370, and/or U.S. Publication Nos. US-2004-0020131 and/or US-2008-0127563, which are all hereby incorporated herein by reference in their entireties.

Changes and modifications to the specifically described embodiments may be carried out without departing from the principles of the present invention, which is intended to be limited only by the scope of the appended claims, as interpreted according to the principles of patent law.

The invention claimed is:

1. A rear slider window assembly for a vehicle, said rear slider window assembly comprising:
   an upper rail and a lower rail;
   a fixed window panel comprising at least one glass panel having an inner surface and an outer surface and an opening between opposite side panel portions of said fixed window panel;
   wherein said upper rail is attached at said inner surface of said fixed window panel at an upper region of said fixed window panel and above said opening;
   wherein said lower rail is attached at said inner surface of said fixed window panel at a lower region of said fixed window panel and below said opening;
   first and second movable window panels that are movable along said upper and lower rails, wherein said first and second movable window panels are movable between a closed position, where said first and second movable window panels cooperate to close the opening, and an opened position, where said first and second movable window panels move away from one another to open the opening;
   a drive system that, when operated, moves said first and second movable window panels along said upper and lower rails between the closed position and the opened position, wherein said drive system comprises (i) a drive element that is connected to said first movable window panel, (ii) a gear element rotatably mounted at the upper rail or the lower rail of said rear slider window assembly, (iii) a first toothed track attached at said first movable window panel and extending toward and overlapping said second movable window panel, and (iv) a second toothed track attached at said second movable window panel and extending toward and overlapping said first movable window panel;
   wherein said first toothed track includes (i) an attaching portion that is attached at an upper region of said first movable window panel and (ii) a toothed portion that extends from said attaching portion toward and adjacent to an upper region of said second movable window panel;
   wherein said second toothed track includes (i) an attaching portion that is attached at an upper region of said second movable window panel and (ii) a toothed portion that extends from said attaching portion of said second toothed track toward and adjacent to an upper region of said first movable window panel;
   wherein said gear element engages said toothed portions of both of said first and second toothed tracks; and
   wherein, when said drive system is operated, said drive element imparts movement of said first movable window panel along said upper and lower rails, and wherein movement of said first movable window panel along said upper and lower rails causes rotation of said gear element via engagement of said gear element with said toothed portion of said first toothed track, and wherein movement of said first movable window panel along said upper and lower rails and rotation of said gear element causes a corresponding movement of said second movable window panel in an opposite direction opposite the movement of said first movable window panel along said upper and lower rails via engagement of said gear element with said toothed portion of said second toothed track.

2. The rear slider window assembly of claim 1, wherein said pear element is rotatable independent of operation of said drive system to allow for manual movement of said first movable window panel and said corresponding movement of said second movable window panel.

3. The rear slider window assembly of claim 1, wherein said gear element is disposed at a center region of said rear slider window assembly.

4. The rear slider window assembly of claim 3, wherein one of said toothed portions is disposed above said gear element and the other of said toothed portions is disposed below said gear element.

5. The rear slider window assembly of claim 1, wherein said drive element is routed through a guide element at a first end of said lower rail and an end of said drive element is attached at an outer end of a carrier of said first movable window panel.

6. The rear slider window assembly of claim 1, comprising a perimeter sealing element that is attached at said fixed window panel and that circumscribes said opening, said perimeter sealing element sealing against a surface of said first and second movable window panels.

7. The rear slider window assembly of claim 6, comprising a center sealing element attached at an inner edge of said first movable window panel that opposes an inner edge of said second movable window panel, wherein said center sealing element is configured to receive the inner edge of said second movable window panel to seal said first and second movable window panels relative to one another when said first and second movable window panels are in the closed position.

8. The rear slider window assembly of claim 7, wherein said perimeter sealing element comprises horizontal lip seals and vertical Y-shaped seals.

9. The rear slider window assembly of claim 1, wherein said fixed window panel comprises a single glass panel having said opening therethrough that is between said opposite side panel portions of said single glass panel.

10. The rear slider window assembly of claim 1, wherein said fixed window panel comprises a pair of opposite side panels that are spaced apart so that said opening is between said side panels.

11. The rear slider window assembly of claim 1, wherein applying a manual force to said first movable window panel imparts movement of said first movable window panel along said upper and lower rails, and wherein movement of said first movable window panel along said upper and lower rails causes rotation of said gear element via engagement of said gear element with said toothed portion of said first toothed track, and wherein movement of said first movable window panel along said upper and lower rails and rotation of said gear element causes the corresponding movement of said second movable window panel in the opposite direction along said upper and lower rails via engagement of said gear element with said toothed portion of said second toothed track.

12. A rear slider window assembly for a vehicle, said rear slider window assembly comprising:
- an upper rail and a lower rail;
- a fixed window panel comprising at least one glass panel having an inner surface and an outer surface and an opening between opposite side panel portions of said fixed window panel;
- wherein said upper rail is attached at said inner surface of said fixed window panel at an upper region of said fixed window panel and above said opening;
- wherein said lower rail is attached at said inner surface of said fixed window panel at a lower region of said fixed window panel and below said opening;
- first and second movable window panels that are movable along said upper and lower rails, wherein said first and second movable window panels are movable between a closed position, where said first and second movable window panels cooperate to close the opening, and an opened position, where said first and second movable window panels move away from one another to open the opening;
- a drive system that moves said first and second movable window panels along said upper and lower rails in tandem between the closed position and the opened position, wherein said drive system comprises (i) a gear element rotatably mounted at the upper rail or the lower rail of said rear slider window assembly, (ii) a first toothed track attached at said first movable window panel and extending toward and overlapping said second movable window panel, and (iii) a second toothed track attached at said second movable window panel and extending toward and overlapping said first movable window panel;
- wherein said first toothed track includes (i) an attaching portion that is attached at an upper region of said first movable window panel and (ii) a toothed portion that extends from said attaching portion toward and adjacent to an upper region of said second movable window panel;
- wherein said second toothed track includes (i) an attaching portion that is attached at an upper region of said second movable window panel and (ii) a toothed portion that extends from said attaching portion of said second toothed track toward and adjacent to an upper region of said first movable window panel;
- wherein said gear element is disposed at a center region of said rear slider window assembly and engages both of said first and second toothed tracks; and
- wherein movement of said first movable window panel along said upper and lower rails causes rotation of said gear element via engagement of said gear element with said toothed portion of said first toothed track, and wherein movement of said first movable window panel along said upper and lower rails and rotation of said gear element causes a corresponding movement of said second movable window panel in an opposite direction opposite the movement of said first movable window panel along said upper and lower rails via engagement of said gear element with said toothed portion of said second toothed track.

13. The rear slider window assembly of claim 12, wherein applying a manual force to said first movable window panel imparts movement of said first movable window panel along said upper and lower rails, and wherein movement of said first movable window panel along said upper and lower rails causes rotation of said gear element via engagement of said gear element with said toothed portion of said first toothed track, and wherein movement of said first movable window panel along said upper and lower rails and rotation of said gear element causes the corresponding movement of said second movable window panel in the opposite direction along said upper and lower rails via engagement of said gear element with said toothed portion of said second toothed track.

14. The rear slider window assembly of claim 12, wherein said gear element is rotatable independent of operation of said drive system to allow for manual movement of said first movable window panel and said corresponding movement of said second movable window panel.

15. The rear slider window assembly of claim 12, wherein one of said toothed portions is disposed above said gear element and the other of said toothed portions is disposed below said gear element.

16. The rear slider window assembly of claim 12, wherein said drive system comprises a drive element that, when operated, causes the movement of said first movable window panel along said upper and lower rails whereby the corresponding movement of said second movable window panel in the opposite direction occurs in tandem with the movement of said first movable window panel.

17. The rear slider window assembly of claim 16, wherein said drive element is routed through a guide element at a first end of said lower rail and an end of said drive element is attached at an outer end of a carrier of said first movable window panel.

18. The rear slider window assembly of claim 12, comprising a perimeter sealing element that is attached at said fixed window panel and that circumscribes said opening, said perimeter sealing element sealing against a surface of said first and second movable window panels.

19. The rear slider window assembly of claim 12, comprising a center sealing element attached at an inner edge of said first movable window panel that opposes an inner edge of said second movable window panel, wherein said center sealing element is configured to receive the inner edge of said second movable window panel to seal said first and second movable window panels relative to one another when said first and second movable window panels are in the closed position.

20. The rear slider window assembly of claim 12, wherein said fixed window panel comprises a single glass panel having said opening therethrough that is between said opposite side panel portions of said single glass panel.

21. The rear slider window assembly of claim 12, wherein said fixed window panel comprises a pair of opposite side panels that are spaced apart so that said opening is between said side panels.

* * * * *

UNITED STATES PATENT AND TRADEMARK OFFICE
CERTIFICATE OF CORRECTION

PATENT NO. : 11,331,984 B2
APPLICATION NO. : 16/748009
DATED : May 17, 2022
INVENTOR(S) : Peggy L. Gustafson Page 1 of 1

It is certified that error appears in the above-identified patent and that said Letters Patent is hereby corrected as shown below:

In the Claims

Column 6
Line 25, Claim 2, "pear element" should be --gear element--

Signed and Sealed this
Fourteenth Day of June, 2022

Katherine Kelly Vidal
*Director of the United States Patent and Trademark Office*